US005107470A

United States Patent [19]

Pedicano et al.

[11] Patent Number: 5,107,470

[45] Date of Patent: Apr. 21, 1992

[54] FAST-ACTING TIME COLOR INDICATOR

[75] Inventors: Ernest A. Pedicano, New Rochelle, N.Y.; Allan G. Sacks, Stamford, Conn.

[73] Assignee: Note/Worthy Products, Inc., Stamford, Conn.

[21] Appl. No.: 492,535

[22] Filed: Mar. 12, 1990

[51] Int. Cl.$^5$ ...................... G04B 17/00; G01N 31/32

[52] U.S. Cl. ..................................... 368/327; 116/200

[58] Field of Search ......................... 368/327; 116/200

[56] References Cited

U.S. PATENT DOCUMENTS

| | | | |
|---|---|---|---|
| 3,520,124 | 6/1970 | Meyers | 368/327 |
| 4,242,153 | 7/1980 | Kydonieus et al. | 368/62 |
| 4,408,557 | 10/1983 | Bradley et al. | 368/327 |
| 4,903,254 | 2/1990 | Haas | 368/327 |

*Primary Examiner*—Bernard Roskoski
*Attorney, Agent, or Firm*—Handal & Morofsky

[57] ABSTRACT

A time color indicator and method are provided. The time color indicator includes a base layer segment having a transparent impermeable layer, a substantially non-curing opaque coating, and a release sheet. A portion of the uncoated surface of the transparent layer bears a printed area including a camouflage pattern printed with non-migrating ink and a message segment printed with migrating ink. An indicator layer segment includes a transparent impermeable layer, a substantially non-curing opaque coating, and a release sheet partially folded back to form a finger gripping tab and expose an indicator layer coating portion which contacts and adheres to the base layer adjacent the printed area. The time color indicator is activated by pulling the finger tab to remove the release sheet, causing the indicator layer coating to cover and contact the printed area, with the message segment migrating through the indicator layer coating. In the method of the invention both the base layer segment and indicator layer segment may be formed in the same process steps from a single web of transparent polyester film, the base layer being printed with the message and the indicator layer segment being divided from the web and superimposed over and adhered to the base segment.

26 Claims, 3 Drawing Sheets

FAST-ACTING TIME COLOR INDICATOR

TECHNICAL FIELD

The present invention relates to a time color indicator, color indicator having and more specifically to a time improved time control and handling characteristics.

BACKGROUND AND OBJECTS OF THE INVENTION

The present invention relates to the type of time color indicator described in U.S. Pat. No. 4,212,153 issued to Kydonieus et al entitled "Time Color Indicator". In general, the Kydonieus patent discloses a time color indicator having a reservoir layer adhesively attached to an indicator layer. In accordance with the Kydonieus patent, a migrating agent in the reservoir layer migrates through the adhesive layer and the indicator layer to the top or front surface of the indicator layer. The Kydonieus patent also teaches that the reservoir layer is preferably mounted on a barrier layer with an adhesive and release sheet on top of the reservoir layer. The indicator is activated by removing the release sheet and applying an indicator layer to the adhesive layer. Alternatively, the adhesive and release sheet may be associated with the indicator layer. Kydonieus further teaches that the indicator layer is a solid sheet or film of non-porous polymer which allows migration of the chosen agent, and that appropriate indicator layer materials include plasticized PVC, semi-plasticized PVC, rigid PVC, acrylics, polyurethanes and hytrel. The Kydoniesus indicator layer is 2 to 14 mils thick, and may contain plasticizers and stabilizers. The reservoir layer is preferably made from a plastisol, although vinyl chloride/vinyl acetate copolymer, a urethane polymer, a polyolefin, hytrel, and polyvinyl chloride may be used in forming the reservoir layer. Kydonieus teaches that the reservoir layer should be 1 to 20 mils thick, and is preferably 1 to 5 mils thick. Kydonieus also contemplates that the reservoir layer may be layered down as an ink onto the barrier layer. Specifically, Kydonieus contemplates printing the reservoir composition on mylar or aluminum foil. The Kydonieus patent suggests that appropriate adhesives include thermosetting or thermoplastic pressure-sensitive acrylics or rubbers. The adhesive layer can be preformed and applied as a sheet, applied with another layer such as a release sheet or by coating. One suggested application for the Kydonieus device is greeting cards.

Kydonieus further teaches that the amount of time required from initiation to perception depends upon and may be controlled through adjustment of the thickness of the indicator layer, indicator layer identity, reservoir concentration, interposition of barrier layers and/or selection of the migrating agent. Kydonieus also contemplates a white indicator layer to provide increased contrast.

Kydonieus discusses use of the time color indicator through comparison of the indicator with a color scaled to determine when conversion is complete. However, Kydonieus also suggests that the reservoir layer could be printed in the shape of words or using a stencilled barrier layer. In practice, ink containing the migrating agent has been printed in the shape of words, with the surrounding area overprinted with similar ink not containing the migrating agent. Typically, however, the screened message can readily be discerned notwithstanding the surrounding overprint.

While the Kydonieus Time Color Indicator represents a significant and useful advance in the art, providing reliable and repeatable control of the time and extent of change have proven difficult.

By way of example, it has proven difficult to provide a time color indicator which obtains consistent conversion in a matter of minutes or hours. For such a short duration indicator adjustment of the time control parameters discussed by Kydonieus does not provide adequate time control. Indeed, adjusting the indicator layer thickness, reservoir concentration, etc. in the manner suggested by Kydonieus have not been found to obtain reliable results. To the contrary, it has been found that the same construction could yield varying time change characteristics. Despite attempts to control the various parameters discussed in the Kydonieus patent, consistent results have been difficult to obtain.

Another problem is that the Kydonieus structure is a two part construction, requiring the user to assemble the indicator and reservoir layers. In Kydonieus' preferred embodiment, a release sheet is removed from either the indicator layer or the reservoir layer to reveal a pressure sensitive adhesive for assembling the components. This construction is also relatively expensive to make, due to the fact that Kydonieus' two part construction requires that each part be produced in separate processes to be assembled in yet another step. The added costs incurred in such manufacture may make the time color indicator too costly under some circumstances.

In practice, the Kydonieus structure has been practiced with an indicator layer consisting of a solid layer containing titanium dioxide coated with a pressure sensitive adhesive and a release sheet. The two part construction is activated by removing the release sheet and applying the adhesive-bearing indicator layer to the reservoir layer. The migrating agent then travels through the pressure sensitive adhesive into the receptive titanium dioxide containing layer.

In longer term applications, it has been found that in the above-described structure the migrating agent or dye becomes dissolved or dispersed in the titanium dioxide containing layer, reducing the sharpness and effectiveness of the displayed message. To overcome this particular problem, it has been suggested to add an additional layer atop the indicator layer, including a further pressure sensitive adhesive layer and a clear, impermeable barrier. In this manner, the migrating agent travels from the reservoir layer through the titanium dioxide-containing layer into the additional pressure sensitive adhesive layer. The message to be displayed is clearly visible against the titanium dioxide background, but the migrating agent does not mix with, dilute, or become dissolved in the titanium dioxide layer. The structure including additional pressure sensitive and clear layers has recently been introduced to the market.

Therefore, it is one object of the invention to provide a time color indicator having improved time change characteristics.

It is a further object of the invention to provide a time color indicator having reliable short duration time change characteristics.

Another object of the invention is to provide a time color indicator which is economical to make and easy to use.

Yet a further object of the present invention is to provide a time color indicator that may readily be activated in a one-step activation procedure.

SUMMARY OF THE INVENTION

It has been found that a problem not previously appreciated with the Kydonieus time color indicator is the effect the presence of an adhesive has on the reservoir and indicator layers. It has been found that adhesives and solvents associated therewith dissolve, absorb and/or disperse the migrating agent. Moreover, variation in adhesive and/or solvent characteristics over time, such as by evaporation of the solvent, may alter the degree and/or rate of transmission of the migrating agent to the indicator. A further problem is that the effects caused by adhesives are not constant, but also vary with time. Thus, the length of time a product remains unused, i.e. the length of time the product remains "on the shelf", comes into play in determining the rate of change of the time color indicator. Unfortunately, there is little or no control over the length of time any given product will remain on the shelf, so the effect of the adhesive cannot adequately be taken into account.

In accordance with the method of the present invention the first side of a clear, impermeable web, such as a polyester film, is coated with a non-curing vinyl-titanium dioxide mixture and a release sheet is applied to the non-curing mixture. A portion of the second side of the clear impermeable web is printed with a printing ink containing a migrating agent. Preferably, the printing with migrating agent is configured in the form of a message to be displayed. In one embodiment, the same or similar printing ink without the migrating agent is used to print a camouflage pattern surrounding the printing ink containing the migrating agent, thereby disguising the message to be displayed. The web is divided to provide a first segment including the printed area and a second, unprinted segment. The release paper of the second segment is partially removed or folded back to expose part of the vinyl mixture, and the second segment is adhered to the first segment with the exposed vinyl mixture contacting the second surface of the impermeable web first segment adjacent to the printed area. The second segment without the release paper folded back is disposed over the first segment, printed portion, with the partially folded back release paper forming a finger tab therebetween.

Thus, the time color indicator in accordance with the present invention has a first segment made of a clear non-permeable web, such as a polyester film, coated on a first, bottom side with a non-curing mixture of vinyl and titanium dioxide and having a release sheet removably attached to the vinyl coating. At least a portion of the second surface of the first segment is printed with an ink containing a migrating agent in the form of a message to be displayed by the time color indicator. A camouflage pattern is printed around the printed message in order to conceal the printed message prior to activation. The camouflage pattern is printed with the same or similar ink as the printed message, but without the migrating ink. The second segment of the time color indicator has a clear, impermeable web, such as a polyester film, coated on a first, bottom side with the non-curing mixture of vinyl and titanium dioxide. A portion of the non-curing mixture is adhered to the first segment second surface adjacent the area printed with the message and camouflage pattern. The remainder of the second segment coated with the non-curing mixture is covered with a release paper, with an extending portion of the release paper folded back at the junction of the first and second segments to form a finger gripping tab. The portion of the second segment covered by the release paper is configured and dimensioned to correspond to and overlie the printed portion of the first segment.

In the activated state, the release paper is removed from the second segment so that the remainder of the coated second segment overlies and adheres to the printed portion of the first segment, obscuring the printed area until the printed message migrates through the vinyl-titanium dioxide mixture to display the desired message. Preferably, the transfer time from activation until the message is displayed and readable is 10 minutes or less, and may be a matter of seconds.

In use, the release paper may be removed from the first segment so that the time color indicator can be adhered to a desired substrate, such as a greeting card or promotional item. To activate the time color indicator, the finger tab is gripped and pulled to remove the remaining release paper associated with the second segment, causing the second segment vinyl mixture to contact and adhere to the first segment overlying the printed area. Thereafter, the migrating agent contained in the printed ink migrates through the vinyl layer of the second segment to display the desired message against the white background of the vinyl-titanium dioxide layer.

Advantageously, the present invention provides a time color indicator which reliably displays a desired message within a matter of seconds or minutes. Surprisingly, the time color indicator of the present invention is not subject to time change variations dependent upon storage time and conditions. This remarkable result is due to the elimination of separate pressure sensitive adhesive and indicator layers which may interact or otherwise alter migrating agent transmission characteristics. As yet a further advantage of the method in accordance with the invention, the time color indicator may economically be produced because the two segments may be made from the same materials in the same manner and process, merely dividing the polyester web to form the first and second segments of the indicator. Because the second segment is predisposed in association with the first segment, the time color indicator may be activated in a single motion by pulling the first segment release paper, causing the exposed, second segment coated surface to contact the first segment printed area. This construction advantageously eliminates the two-step activation process required to assemble and activate prior time color indicators. That is, prior time color indicators consisted of separate indicator and reservoir layers mounted adjacent to each other, with the time color indicator being activated by removing the indicator layer from a release sheet, aligning the indicator layer over the reservoir layer, and pressing the indicator layer bearing a pressure sensitive adhesive onto the indicator layer. In addition, camouflage printing the area surrounding the message printed with ink containing the migrating agent prevents the message from being perceived prior to activation.

These and other advantages of the invention are accomplished in a convenient time color indicator which is economical to produce and easy to use.

DETAILED DESCRIPTION OF THE PREFERRED EMBODIMENTS

Figure 1:
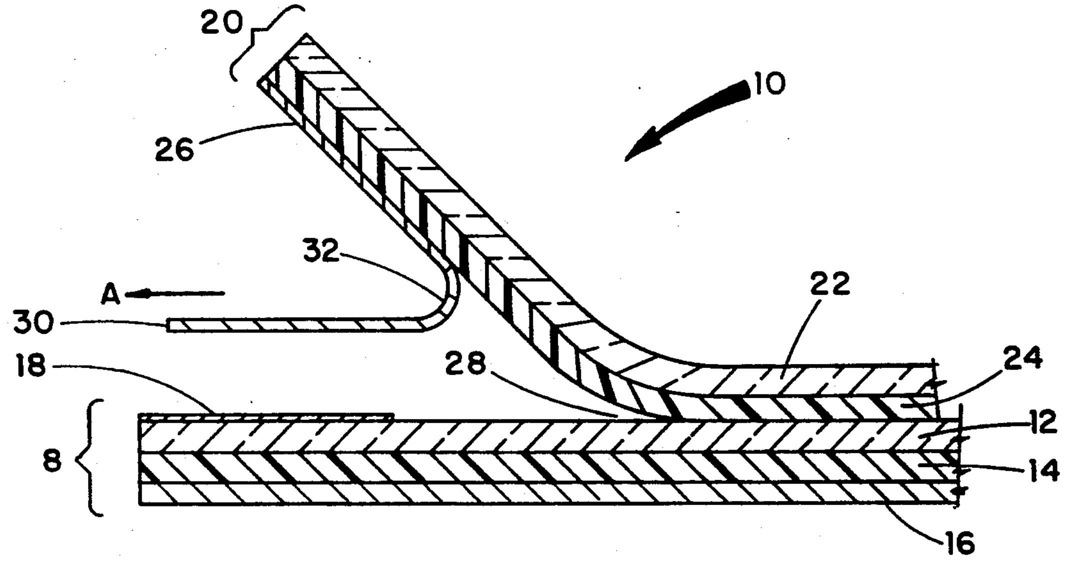
FIG. 1 is a side cross section view of the time color indicator constructed in accordance with the preferred embodiment of the invention.

Referring now to the drawings, particularly FIG. 1, the preferred time color indicator 10 includes a base segment 8 and an indicator layer segment 20. The base segment includes a clear impermeable base 12 coated on one surface thereof with a non-curing coating 14 having a base segment release sheet 16. A portion of the other surface of clear impermeable base 12 bears a printed ink area 18. At least a portion of the printed ink contains a migrating agent. The indicator layer 20 is of essentially identical construction, including a clear impermeable top layer 22, a non-curing indicator layer coating 24, and an indicator layer release sheet 26. However, top layer release sheet 26 is partially removed or peeled back, and the exposed area 28 of top layer coating 24 contacts and adheres to a portion of the surface of base 12 adjacent printed ink area 18. The partially peeled-back top layer release sheet forms a gripping tab 30. To activate the time color indicator, gripping tab 30 is pulled in the direction of arrow "A" to peel the remainder of the top release sheet 26 from indicator layer 20. Because indicator layer 20 is secured to base layer 12 at 28, top layer 20 becomes disposed over printed area 18 (see FIG. 4) to activate the indicator.

FIG. 1 is a cross section side view of the preferred time color indicator prior to activation. As discussed, base layer 12 is coated on the lower or bottom side with a non-curing base layer coating 14 which, in turn, bears a release sheet 16. Base layer coating 14 and release sheet 16 are optional, but provide for convenient manufacture and use of the time color indicator in any given application. The top or upper surface of base layer 12 is partially covered by a printed ink area 18. At least a portion of the printed ink incorporates a migrating agent. Base layer 12 should be a barrier to the migrating agent contained in the ink. It is further preferred that printed ink area 18 include two components, a message component printed with ink containing the migrating agent and a camouflage portion printed with a similar ink not containing a migrating ink. For reasons which will become apparent below, base layer 12 preferably constitutes a clear polyester layer, such as "Mylar" (E.I. duPont de Nemours & Co.), and coating 14 is a non-curing plasticizer-vinyl-titanium dioxide mixture. FIG. 1 also illustrates top layer 20 disposed in a first, pro-activation position with non-curing indicator layer coating 24 partially exposed and in adhering contact with base layer 12 at contact area 28 adjacent printed ink area 18. Top layer release sheet 26 is removably adhered to indicator layer coating layer 24 at all areas except where release sheet 26 has been partially peeled back to form gripping tab 30 and to expose coating 24 for contacting base layer 12 at contact area 28. Top layer release sheet 26 is peeled back and folded at a fold line 32, such that printed area 18 does not contact indicator layer coating 24 in the pre-activation position shown in FIG. 1. Indicator top layer 22 is disposed above indicator layer coating 24. For reasons which will become apparent below, top layer 22 preferably is also a clear impermeable sheet, such as clear "Mylar" and indicator layer coating 24 is a non-curing plasticizer-vinyl-titanium dioxide mixture.

Figure 2:
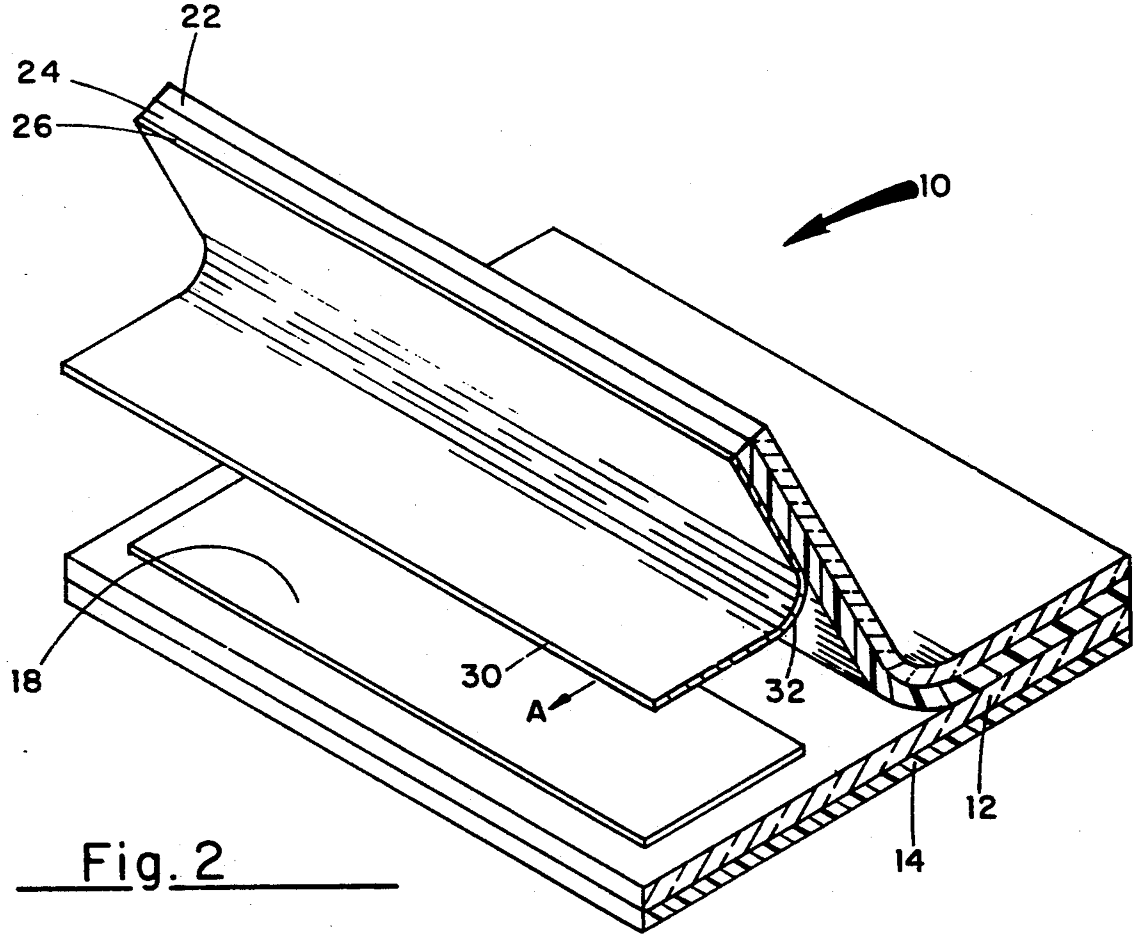
FIG. 2 is a perspective view of the time color indicator constructed in accordance with the invention attached to a receiving surface prior to activation.

FIG. 2 is a perspective view of the indicator in accordance with the preferred embodiment of the invention mounted to a receiving surface. As depicted in FIG. 2, release sheet 16 has been removed and background coating 14 is adhered to a receiving surface. Indicator 10 is again shown in the pre-activation position. FIG. 2 clearly shows the printed ink area with camouflage printing to obscure the message component in the pre-activation position shown.

Figure 3:
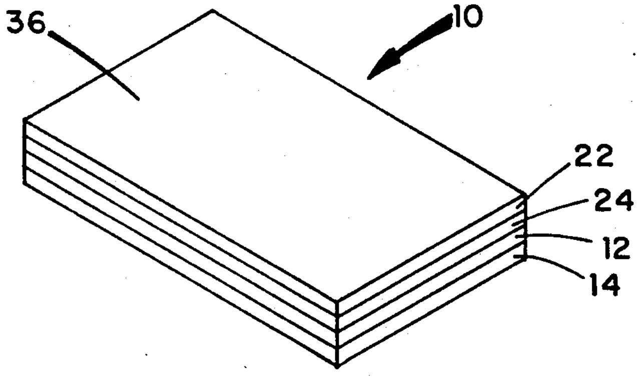
FIG. 3 is a perspective view of the time color indicator of FIG. 2 after activation.
Figure 4:
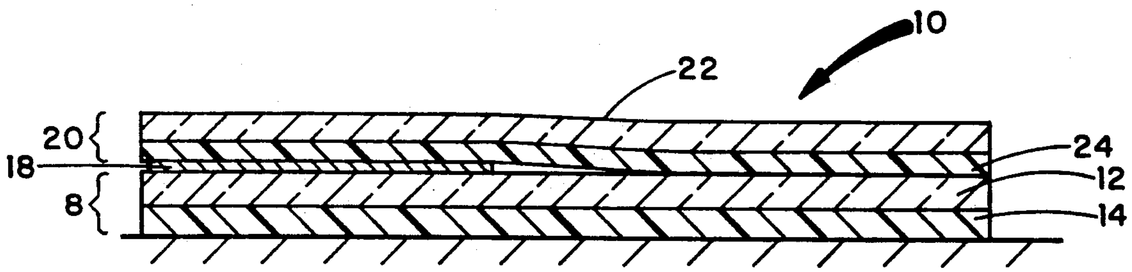
FIG. 4 is a side cross-section view of the time color indicator of FIG. 3.

FIG. 3 is a perspective view of the indicator after activation and transfer of the migrating ink component. As in FIG. 2, the indicator is shown with the release sheet removed, the indicator being disposed on a receiving surface with layer 14 securing the indicator to the receiving surface. In the activated position shown in FIG. 3, indicator layer 20, and, more specifically, indicator layer coating 24, contacts and adheres to substrate 12, with coating 24 contacting the printed ink area (not shown). FIG. 4 is a side cross-section view of the indicator of FIG. 3, showing in exaggerated detail indicator layer 20 overlying printed ink area 18 with indicator layer coating 24 in contact with the printed ink area. As shown in FIG. 3, the migrating component of the printed ink area has migrated through the opaque plasticizer-vinyl-titanium dioxide mixture of coating layer 24 to display the message component of the printed ink area. In FIG. 3, the message component 36 is illustrated as a birthday salutation. The opaque coating 24 provides a background for message display and obscures the non-migrating camouflage component of the printed ink area.

As stated, indicator top layer 22 and substrate layer 12 are preferably made of transparent impermeable polyester, such as clear "Mylar" film available from E.I. duPont de Nemours & Co. :In the context of the present invention, the term "impermeable" as used to describe indicator layer 22 and substrate layer 12 shall be understood to mean that layers 12, 22 have a molecular structure which effectively prevents passage of the migrating agent into or through these layers. Thus, substrate 12 effectively prevents the migrating agent contained in printed ink area 18 from migrating downwardly. Although not critical to the present invention, the indicator top layer 22 similarly prevents transfer of the migrating agent through indicator layer 24 into top layer 22. In the interests of efficiency and economy, substrate or base layer coating 14 and indicator layer 24 may be and preferably are made of the same mixture. The preferred non-curing polymer coating mixture contains about sixty four percent (64%) by weight plasticizer, such as the polyester plasticizer available under the tradename "ADMEX" from Huls America, Inc., Piscataway, New Jersey, twenty percent (20%) by weight titanium dioxide ($TiO_2$), and sixteen percent (16%) by weight plolyvinyl chloride resin.

The foregoing plasticizer-vinyl-titanium dioxide mixture has been found to provide the desired opacity and non-curing adhesive properties in a coated layer which is permeable to an appropriate migrating dye. Numerous migrating dyes, including dyes known as transfer dyes, may appropriately be mixed with conventional printing inks to obtain the desired migrating printed ink. Appropriate dyes are disclosed in the foregoing Kydonieus U.S. Pat. No. 4,212,153 and appropriate inks include conventional printing inks, such as standard RMS colors available, inter alia, from Gotham Inks. In the preferred embodiment, "POLYCRON CERISE NA" (1-amino-4-hydroxy-2-phenoxy-9, 10-anthracenedione) from Atlantic Chemical Corporation, Nutley, New Jersey, is used as the migrating agent mixed with conventional printing ink. The same ink without migrating dye is used to print the camouflage portion of the printed area.

The method of making the time color indicator constructed in accordance with the present invention obtains significant cost, processing and material advantages which make the invention economical and commercially attractive.

FIGS. 5A through 5E illustrate the partially constructed time color indicator after each key step in the method of manufacture contemplated by the present invention, with numeral references generally corresponding to FIGS. 1-4 increased by 100.

Figure 5A:
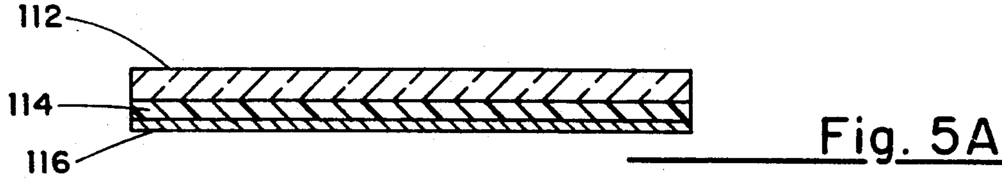
FIGS. 5A through 5E illustrate the intermediate products of the method of the present invention obtained in making the structure of FIGS. 1 through 4.
Figure 5B:
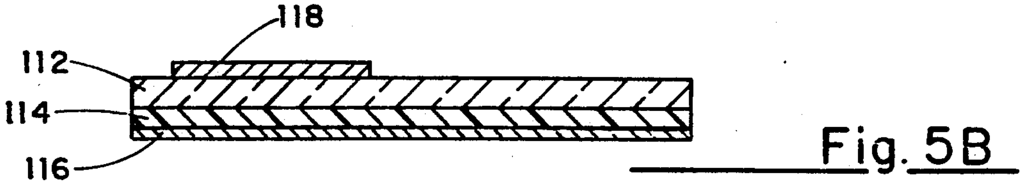
Figure 5C:
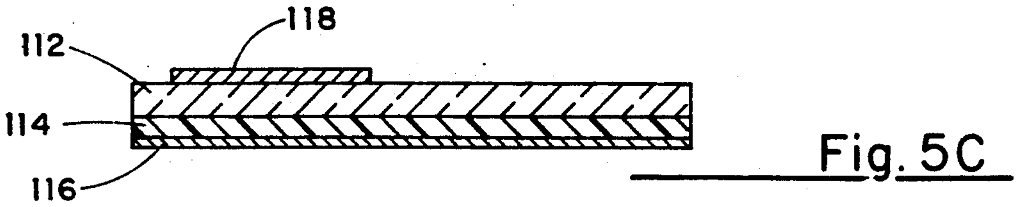
Figure 5D:
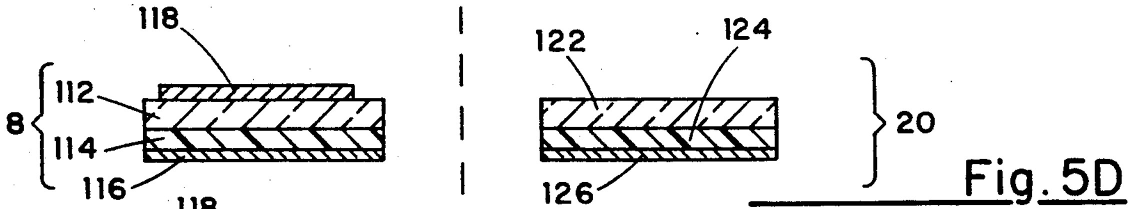
Figure 5E:
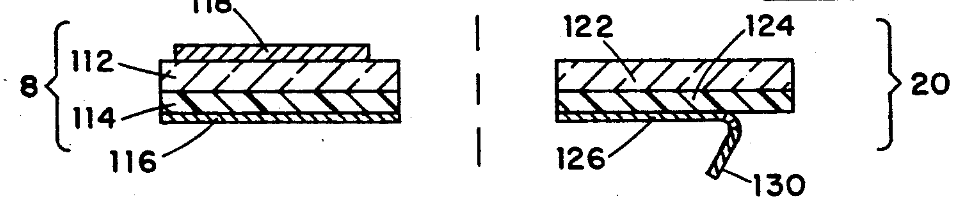

FIG. 5A shows clear impermeable film 112 coated with the preferred mixture of vinyl, plasticizer and titanium dioxide, covered by bottom release layer 116. FIG. 5B shows the base layer with the first portion of printed area 118, and FIG. 5C shows the base layer with the entire printed area complete. FIG. 5D shows the web of FIG. 5C divided longitudinally to form the base layer segment 8 and indicator layer segment 20. In FIG. 5E, the release sheet 126 of the indicator layer segment 20 is partially peeled back in preparation to assemble the time color indicator into the configuration illustrated in FIGS. 1 and 2.

The preferred method of the present invention will now be described with reference to FIGS. 5A through 5E.

In accordance with the method of the invention, a clear impermeable web 112, such as the preferred polyester web, is coated on a first surface with a non-curing plasticizer-vinyl-titanium dioxide mixture, and a release sheet is applied over the coating. Coating 114 may be applied by coating, spraying, brushing or any other appropriate process. The product of these steps of the method is shown in FIG. 5A. Thereafter, an ink not including a migrating agent is printed on a portion of the second surface of the web in a camouflage pattern as the first component of printed ink area 118. A similar ink incorporating a migrating agent is printed in the configuration of the desired message overlying the camouflage pattern to complete printed ink area 118, as shown in FIG. 5C. Both the camouflage pattern and migrating message portion may be printed using any appropriate printing process, such as offset or flexographic printing. At this point, the web is divided longitudinally to form base layer segment 8 and indicator layer segment 20 as shown in FIG. 5D. The release sheet 126 on the indicator segment 20 is partially peeled back to reveal a portion of the plasticizer-vinyl-titanium dioxide mixture and form gripping tab 130 (see FIG. 5E). At this point, the indicator segment is mounted onto the base segment 8 in the configuration shown in FIGS. 1 and 2, with the exposed coating area contacting the second web surface adjacent to printed area 118.

Of course, substantially the same results could be obtained in a different sequence of steps. Thus, the printed portion 118 could be printed onto the second web surface either before or after coating the web. Alternatively, the web could be coated and divided prior to printing one of the divided segments and assembling the segments into the desired configuration. However, it is preferred that the non-migrating camouflage printing be applied prior to printing the migrating message, so that non-migrating ink is not printed over with the migrating ink, which may interfere with or delay migration.

In use, the apparatus of FIG. 1 is applied to a receiving surface, such as a greeting card, by removing the base layer release sheet 16 and adhering the apparatus to the receiving surface, as depicted in FIG. 2. To activate the indicator, gripping tab 30 is pulled in the direction of arrow A (FIG. 2) to remove the indicator layer release sheet 26 and cause indicator layer coating 24 to contact and adhere to printed area 18. After activation, the migrating agent contained in printed area 18 is transmitted through indicator layer coating 24 during a period of time less than twenty-four hours and preferably in a matter of minutes, such as five or ten minutes, to reveal the form of the desired message against the white background of coating 24. Coating 24 also obscures the camouflage pattern printed with non-migrating ink. (see FIG. 3).

Figure 6:
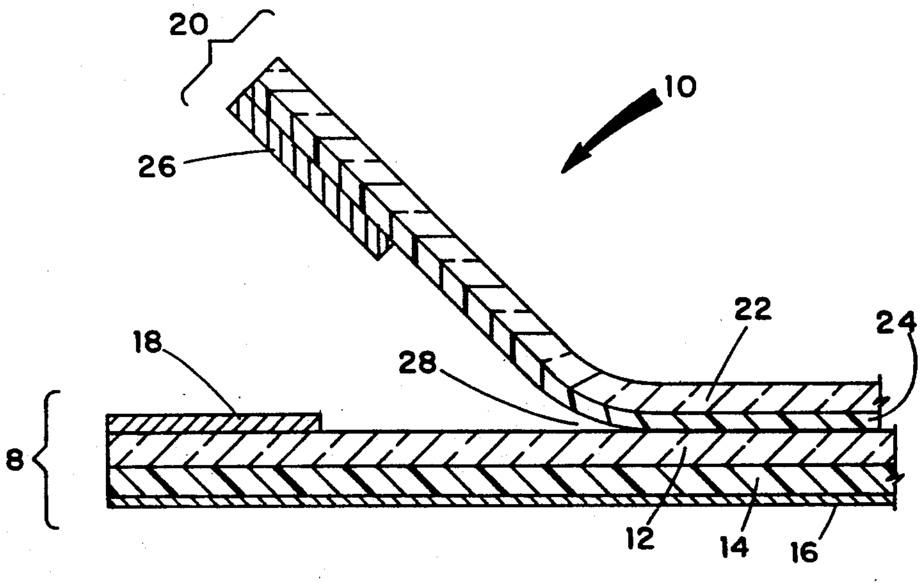
FIG. 6 is a side cross section view of a time color indicator constructed in accordance with an alternative embodiment of the invention.

An alternative embodiment is shown in FIG. 6, a cross-section view of the indicator having identical reference numerals for like elements. As there shown, in this embodiment indicator 10 includes a base segment 8 and an indicator layer segment 20. As in the previous embodiment, the base segment includes a clear impermeable base 12 coated on one surface thereof with non-curing base layer coating 14 and having a base segment release sheet 16. The indicator layer 20 is of essentially identical construction, including a clear impermeable top layer 22, a non-curing indicator layer coating 24, and an indicator layer release sheet 26. Also, as in the preferred embodiment, a portion of release sheet 26 has been removed so that a portion of indicator layer coating 24 is exposed and contacts impermeable base 12 at 28. In this manner, indicator layer 20 is adhered to base layer 8 with the portion of indicator layer 20 still bearing release sheet 26 disposed adjacent printed area 18 on base 12. Unlike the preferred embodiment, however, release sheet 26 is not folded back to form a finger gripping tab. Although less preferred, it is contemplated that simply removing a portion of release sheet 26 instead of folding the release sheet back may eliminate a manufacturing step, making the invention even more cost efficient. Thus, with reference to FIGS. 5D and 5E, the indicator layer would be fabricated by scoring and removing a portion of release sheet 126 instead of folding the release sheet back. This may be more efficient and easier to accomplish in a continuous line process.

The device in accordance with the alternative embodiment is used in substantially the identical manner as the preferred embodiment including a finger gripping portion. However, instead of pulling on a finger gripping portion to remove the indicator layer release sheet, release sheet 26 is manually removed by being peeled from indicator layer coating 24. Because coating 24 is non-curing, this is readily accomplished by prying loose an edge of release sheet 26 and then peeling off the entire layer. As will be apparent, the alternative embodiment may be slightly less convenient to use, but may be wholly satisfactory in some applications where the reduced manufacturing cost would make the device more cost competitive.

Advantageously, the time color indicator conveniently may be made in an economical process and assembled into an easy to use indicator device. The indicator in accordance with the invention transmits the desired migrating message quickly, on the order of about ten (10) minutes, but certainly less than about one hour.

The foregoing description and drawings are intended to be illustrative and explanatory of the invention, but are not the only means of obtaining the advantages of the invention. Numerous changes and alternations will occur to those of ordinary skill in the art in view of the present application and/or practice with the invention. Therefore, the foregoing description and drawings should be considered to be illustrative and exemplary of the invention within the scope of the claims.

What is claimed is:

1. A fast-acting time color indicator comprising:

a base layer bearing on a portion thereof a message printed with an ink containing a migrating agent;

an activation layer having a transparent layer, a substantially non-curing polymer coating coated onto a first surface of said transparent layer, and a release sheet covering a portion of said coating, said activation layer assuming a first, non activated position with the exposed portion of said coating contacting said base layer adjacent to said printed portion, and said release sheet being disposed adjacent said printed portion, said actuation layer assuming a second, activated position with said release sheet removed and said non-curing coating directly contacting said printed portion, said migrating agent migrating through said substantially non-curing polymer coating to display said message at said first surface, said migrating agent migrating through said coating to display said message in less than twenty four hours.

2. The apparatus according to claim 1, wherein said release sheet further comprises a gripping tab.

3. The apparatus of claim 1, wherein said base layer further comprises a transparent impermeable layer with a substantially non-curing base layer coating and base layer release sheet disposed on the base layer surface opposite to said printed portion.

4. The apparatus of claim 3, wherein said transparent impermeable layer is a clear polyester.

5. The apparatus of claim 4, wherein said base layer coating is a plasticizer-vinyl-titanium dioxide mixture.

6. The apparatus of claim 1, wherein said transparent layer is a clear polyester.

7. The apparatus of claim 6, wherein said activation layer coating is a plasticizer-vinyl-titanium dioxide mixture.

8. The apparatus of claim 1, wherein said printed portion further comprises a non-migrating printed component printed with an ink not containing a migrating agent and a migrating printed component printed with an ink containing a migrating agent.

9. The apparatus of claim 8, wherein said non-migrating printed component camouflages said migrating printed component when said activation layer assumes said first, non-activated position.

10. The apparatus of claim 1, wherein said migrating agent migrates through said non-curing coating in less than about ten minutes when said actuation layer assumes said second, activated position.

11. A method making a fast-acting time color indicator comprising the steps of:

providing a base layer having first and second surfaces;

printing a portion of said first base layer surface with an ink containing a migrating agent;

forming an indicator layer by, (i) providing a transparent layer;

(ii) coating one surface of said transparent layer with a substantially non-curing polymer indicator layer coating;

(iii) disposing a release sheet over a portion of said coating;

(iv) assembling said base layer and said indicator layer into a first, non-activated position by directly contacting the exposed portion of said non-curing polymer coating to said base layer adjacent to said printed portion, so that said release sheet is disposed adjacent said printed portion.

12. The method of claim 11 further comprising the step of activating said time color indicator by removing said release sheet and causing said indicator layer coating to substantially overlie said printed portion with said non-curing polymer coating directly contacting said printed portion, said migrating agent migrating through said polymer indicator layer coating to said one surface of said transparent layer to display a desired message in less than 24 hours.

13. The method of claim 11 wherein said printing step further comprises:

printing a camouflage pattern onto said base layer with an ink not containing a migrating agent; and printing a message to be displayed onto said base layer with an ink containing a migrating agent, said camouflage pattern concealing said message when said activation layer assumes said non-activated position.

14. The method of claim 11, wherein said step of forming an indicator layer further comprises the additional step of folding a portion of said release sheet back on itself between said indicator layer and said base layer to form a gripping tab therebetween.

15. The method according to claim 11, wherein said step of providing a transparent indicator layer further comprises providing a clear polyester layer.

16. The method according to claim 11, wherein said coating step further comprises coating one surface of said transparent layer with a mixture of plasticizer-vinyl-titanium dioxide.

17. The method according to claim 11, wherein said step of providing a base layer further comprises providing a transparent layer having first and second surfaces, and coating said second surface opposite said printed area with a substantially non-curing coating.

18. The method of claim 17, wherein said base layer coating is a plasticizer-vinyl-titanium dioxide mixture.

19. A method of making a time color indicator comprising: providing a transparent impermeable web;

coating a first surface of said web with a highly plasticized substantially non-curing polymer coating;

disposing a release sheet over said coating;

printing an area of the second surface of said web, at least a portion of said printed area containing a migrating agent;

dividing said web longitudinally to form a base layer segment bearing said printed area and an indicator layer segment;

removing a portion of said indicator segment release sheet to expose a portion of said indicator segment coating; disposing said indicator segment over said base layer segment with said exposed indicator segment coating directly contacting and adhering to said base segment first surface adjacent to said printed area.

20. The method of claim 19, wherein said printing step further comprises the steps of:

printing a camouflage pattern with an ink not containing a migrating agent; and printing a message to be displayed with an ink containing a migrating agent.

21. The method according to claim 19, wherein said coating step further comprises coating said first surface with a mixture of plasticizer-vinyl-titanium dioxide.

22. The method according to claim 19, wherein said step of removing a portion of said indicator segment release sheet further comprises folding back a portion of said indicator segment release sheet upon itself between said indicator segment and said base layer segment to form a fold line adjacent the junction of said base layer segment and said indicator segment to form a gripping tab extending therefrom.

23. A fast-acting time color indicator comprising a base layer bearing on at least a portion thereof a message printed with an ink containing a migrating agent; and an activation layer having a transparent layer and a highly plasticized substantially non-curing polymer coating, said activation layer assuming a first, non-activated position with said plasticized polymer coating contacting a release sheet and a second, activated position with said plasticized polymer coating removed from said release sheet and directly in contact with said ink containing a migrating agent, said migrating agent migrating through said polymer coating to display said message in less than 24 hours.

24. The indicator according to claim 23 further comprising camouflage printing surrounding said message on said base layer, said camouflage printing being printed with an ink not containing a migrating agent.

25. The indicator of claim 23 wherein said plasticized polymer coating is a mixture of plasticizer-vinyl-titanium dioxide.

26. The indicator of claim 23 wherein said transparent layer is a clear polyester.

* * * * *